United States Patent
Tanaka et al.

(10) Patent No.: US 8,386,783 B2
(45) Date of Patent: Feb. 26, 2013

(54) COMMUNICATION APPARATUS AND COMMUNICATION METHOD

(75) Inventors: Kei Tanaka, Kawasaki (JP); Toshiya Saitoh, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1563 days.

(21) Appl. No.: 11/761,471

(22) Filed: Jun. 12, 2007

(65) Prior Publication Data

US 2008/0133915 A1  Jun. 5, 2008

(30) Foreign Application Priority Data

Dec. 4, 2006  (JP) ................................. 2006-327590
Dec. 25, 2006  (JP) ................................. 2006-346937

(51) Int. Cl.
  *H04L 29/06* (2006.01)
(52) U.S. Cl. ......................................... 713/171; 726/11
(58) Field of Classification Search .................. 713/171; 726/11
  See application file for complete search history.

(56) References Cited

U.S. PATENT DOCUMENTS

| 6,904,600 | B1 * | 6/2005 | James et al. ................... 719/328 |
| 7,055,027 | B1 * | 5/2006 | Gunter et al. .................. 713/151 |
| 7,117,526 | B1 * | 10/2006 | Short ................................. 726/5 |
| 2001/0056550 | A1 * | 12/2001 | Lee ................................ 713/201 |
| 2002/0069366 | A1 * | 6/2002 | Schoettger ..................... 713/201 |
| 2002/0161904 | A1 | 10/2002 | Tredoux et al. |
| 2003/0229779 | A1 | 12/2003 | Morais et al. |
| 2005/0018840 | A1 * | 1/2005 | Yung et al. ....................... 380/28 |
| 2007/0180512 | A1 * | 8/2007 | Chaudhuri et al. ............. 726/12 |
| 2008/0005791 | A1 * | 1/2008 | Gupta et al. .................... 726/15 |

FOREIGN PATENT DOCUMENTS

| JP | 2003-050756 A | 2/2003 |
| JP | 2003-509775 A | 3/2003 |
| JP | 2004-056784 A | 2/2004 |
| JP | 2004-192358 A | 7/2004 |
| JP | 2004-320715 A | 11/2004 |
| WO | WO 01/20531 A1 | 3/2001 |

OTHER PUBLICATIONS

H. Jitsumori, Internet in 2004, Nikkei Internet Solutions No. 78, Japan, Nikkei Business Publications, Inc., Dec. 22, 2003, No. 78, pp. 44-46.
Japanese Office Action issued Aug. 23, 2011 for counterpart Japanese Application No. 2006-327590.

* cited by examiner

*Primary Examiner* — Jeffrey Pwu
*Assistant Examiner* — Michael D Anderson
(74) *Attorney, Agent, or Firm* — Sughrue Mion, PLLC

(57) ABSTRACT

A communication system performs a communication after establishing a channel from an external host device in an external network to an internal host device in an internal network, where a firewall blocks communications from the external host device in the external network to the internal host device in the internal network while selectively allowing communications from the internal network to the external network. The external host device includes a transmitting unit that transmits channel maintenance data to the internal host device when the channel needs to be maintained, with the channel maintenance data being used for maintaining the channel.

10 Claims, 10 Drawing Sheets

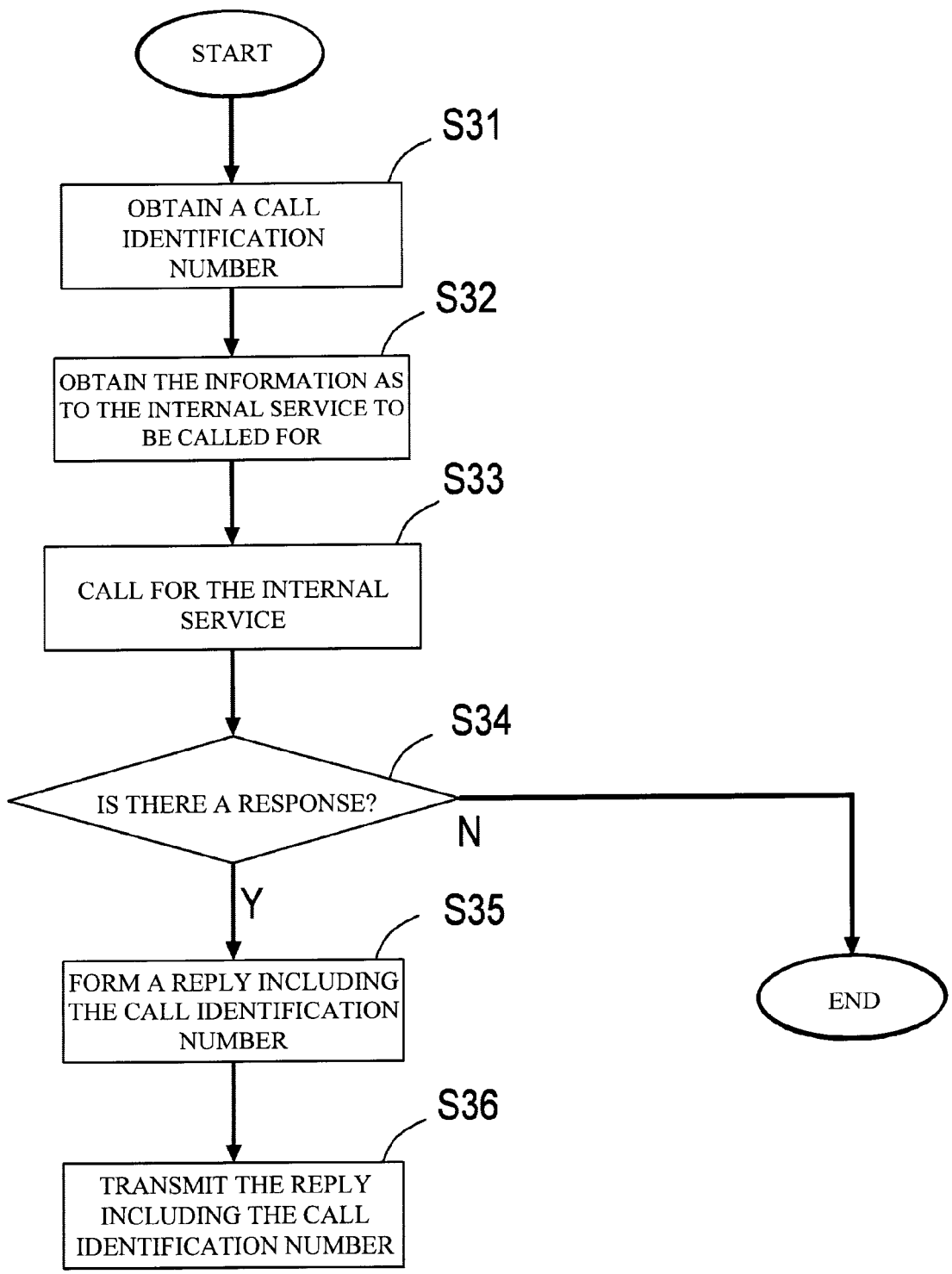

COMMUNICATION APPARATUS AND COMMUNICATION METHOD

CROSS-REFERENCE TO RELATED APPLICATIONS

This application is based on and claims priority under 35 USC 119 from Japanese Patent Application No. 2006-327590 filed Dec. 4, 2006 and Japanese Patent Application No. 2006-346937 filed Dec. 25, 2006.

BACKGROUND

1. Technical Field

The present invention relates to a communication apparatus and a communication method.

2. Related Art

In recent years, the technique of establishing a new service by combining various services distributed over a network such as the Internet has been attracting attention. Particularly, a method called "Web service" has started spreading widely. A Web service is formed on the basis of known standard techniques such as HTTP (Hyper Text Transfer Protocol), SOAP (Simple Object Access Protocol), and XML (Extensible Markup Language).

In a business organization, a system called "firewall" is normally employed on the boundary between the Internet and the internal network of the company, so as to limit accesses to the internal network from the Internet. In such an environment where the firewall exits, there are needs to call for services involving a computing resource existing in the internal network through services formed on the Internet.

To satisfy such needs, it is necessary to enable communications from the Internet to internal networks. To do so, the VPN (Virtual Private Network) technique or a technique called "Reverse Proxy" is normally used. The VPN technique has the problem of requiring an expensive device such as a special-purpose router. According to the Reverse Proxy technique, a proxy that has an orientation opposite to the regular orientation is provided on a network boundary, and internal network resources are disclosed in a limited fashion. However, Reverse Proxy has the problem of requiring a change in the structure of the firewall or the network boundary.

SUMMARY

According to an aspect of the present invention, there is provided a communication system that performs a communication after establishing a channel extending from an external host device in an external network to an internal host device in an internal network, where a firewall blocks communications from the external host device in the external network to the internal host device in the internal network while selectively allowing communications from the internal network to the external network. The external host device includes a transmitting unit that transmits channel maintenance data to the internal host device when the channel needs to be maintained, the channel maintenance data being used for maintaining the channel.

BRIEF DESCRIPTION OF THE DRAWINGS

Other objects, features and advantages of the present invention will become more apparent from the following detailed description when read in conjunction with the accompanying drawings, in which:

FIG. 4 is a flowchart of an operation to be performed by the internal host device upon receipt of an internal service call;

FIG. 5A and FIG. 5B are a flowchart of an operation to be performed by the external host device when an internal service is called for;

DETAILED DESCRIPTION

The following is a description of exemplary embodiments of the present invention.

First Exemplary Embodiment

Figure 1:
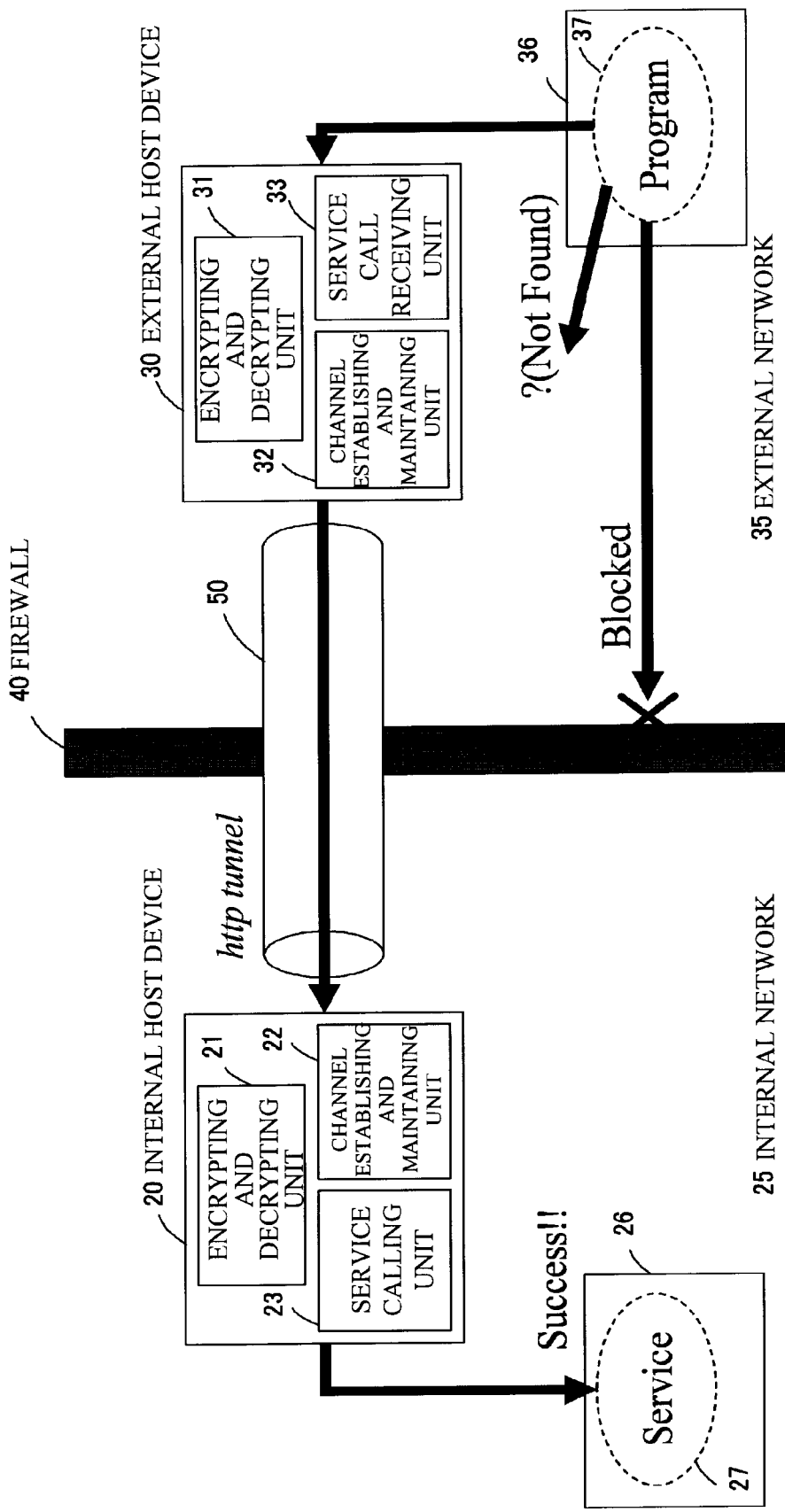
FIG. 1 illustrates the structure of a communication system in accordance with a first exemplary embodiment of the present invention.

FIG. 1 illustrates the structure of a communication system 10 in accordance with a first exemplary embodiment of the present invention. As shown in FIG. 1, the communication system 10 includes an internal host device 20 that starts a session, and an external host device 30 that receives the session. The internal host device 20 and the external host device 30 are connected to each other via a firewall 40. In this communication system 10, the firewall 40 blocks communications from the external host device 30 in an external network 35 to the internal host device 20 in an internal network 25, and selectively allows communications from the internal network 25 to the external network 35. In this environment, a tunnel 50 extending from the external host device 30 in the external network 35 to the internal host device 20 in the internal network 25 is constructed for communications.

The firewall 40 normally blocks communications from the external network 35 to the internal network 25 via the Internet. The firewall 40 also selectively allows communications from the internal network 25 to the external network 35. When the firewall 40 selectively allows a communication, only preauthorized packets among data packets to be transmitted between the internal network 25 and the external network 35 are allowed to pass, and the other packets are blocked. This operation is called a filtering operation. Alternatively, only communications via a special application called an "application gateway (typically, HTTP Proxy)" may be allowed. A filtering operation is normally set by designating the IP (Internet Protocol) address of the transmitting terminal, the IP address of the other end terminal, the type of protocol to be used, a port number, and the likes. A port number is an identifier to be used for identifying the process in the upper layer in TCP or UDP (User Datagram Protocol).

The internal host device 20 is connected to the internal network 25 such as an in-house intranet, and transmits a connection request to the external host device 30 existing in an outside network that is the external network 35. This internal host device 20 includes an encrypting and decrypting unit 21, a channel establishing and maintaining unit 22, and a service calling unit 23. The external host device 30 is connected to the external network 35 such as the Internet, and receives the connection request from the internal host device 20. The external host device 30 includes an encrypting and decrypting unit 31 as the electronic signature attaching unit and the encrypting unit, a channel establishing and maintaining unit 32 as the transmitting unit and the channel establishing unit, and a service call receiving unit 33.

The encrypting and decrypting units 21 and 31 encrypt transmission data to be transmitted via the tunnel 50, and, if necessary, encrypt or decrypt a part of XML data. In a case where the transmission data is structured data and confidential information is contained in the transmission data, the encryption/decryption/signature/verification units 21 and 31 encrypt only a part (the essential part) of the structured data by an encryption technique such as the XML encryption technique.

The service calling unit 23 calls for an appropriate internal service 27 in a terminal 26, in response to a service call transmitted from the service call receiving unit 33 via the tunnel 50. The service calling unit 23 establishes a different channel from the channel maintained by the channel establishing and maintaining unit 22, and returns a result to the external host device 30. The external host device 30 receives the reply and returns the reply to the caller. In this manner, an internal service available in the internal network 25 of the company can be called out from the external network 35 beyond the firewall 40. When transmitting a call request to the service calling unit 23 through the tunnel 50, the service call receiving unit 33 also transmits an identifier for identifying the call. When returning a result to the external host device 30, the service calling unit 23 also returns the identifier. Accordingly, even if the reply is transmitted through a different channel from the tunnel 50, the service call receiving unit 33 can correctly identify the set of a service call and a reply to the service call.

In a case where the structured data is a SOAP document, the encrypting and decrypting unit 31 encrypts only the body of the structured data, and does not encrypt the header. In this manner, the firewall manager can monitor the data being transmitted through the channel, except for the data requiring confidentiality. Thus, the firewall manager can monitor which data is being transmitted to which other end. The encrypting and decrypting unit 31 also has the function of attaching an electronic signature to each piece of transmission data to be transmitted through the tunnel 50.

The channel establishing and maintaining unit 32 establishes the tunnel 50 leading to the channel establishing and maintaining unit 22 of the internal host device 20, not encrypting the channel, in accordance with the Reverse Tunneling technique. To maintain the channel, the channel establishing and maintaining unit 32 transmits channel maintenance data for maintaining the tunnel 50 whenever it is necessary to maintain the tunnel 50. The channel maintenance data contains such data as NOP (No Operation: one of the CPU (Central Processing Unit) instructions) meaning there are no operations to be performed.

After a connection is established, the channel establishing and maintaining unit 32 transmits the NOP data in appropriate timing to maintain the connection. More specifically, when it is not necessary to call for a service, the channel establishing and maintaining unit 32 maintains the connection of the channel by transmitting the channel maintenance data.

The service call receiving unit 33 receives a service call in the internal network 25 from an external program 37 in a terminal 36, and transmits service call data for calling for a service to the internal host device 20 through the channel maintained by the channel establishing and maintaining unit 32. The service call receiving unit 33 also transfers a result returned from the service calling unit 23 to the external program 37. Here, to call for a service, the service call receiving unit 33 uses structured text data such as SOAP data (XML data, for example).

Figure 2:
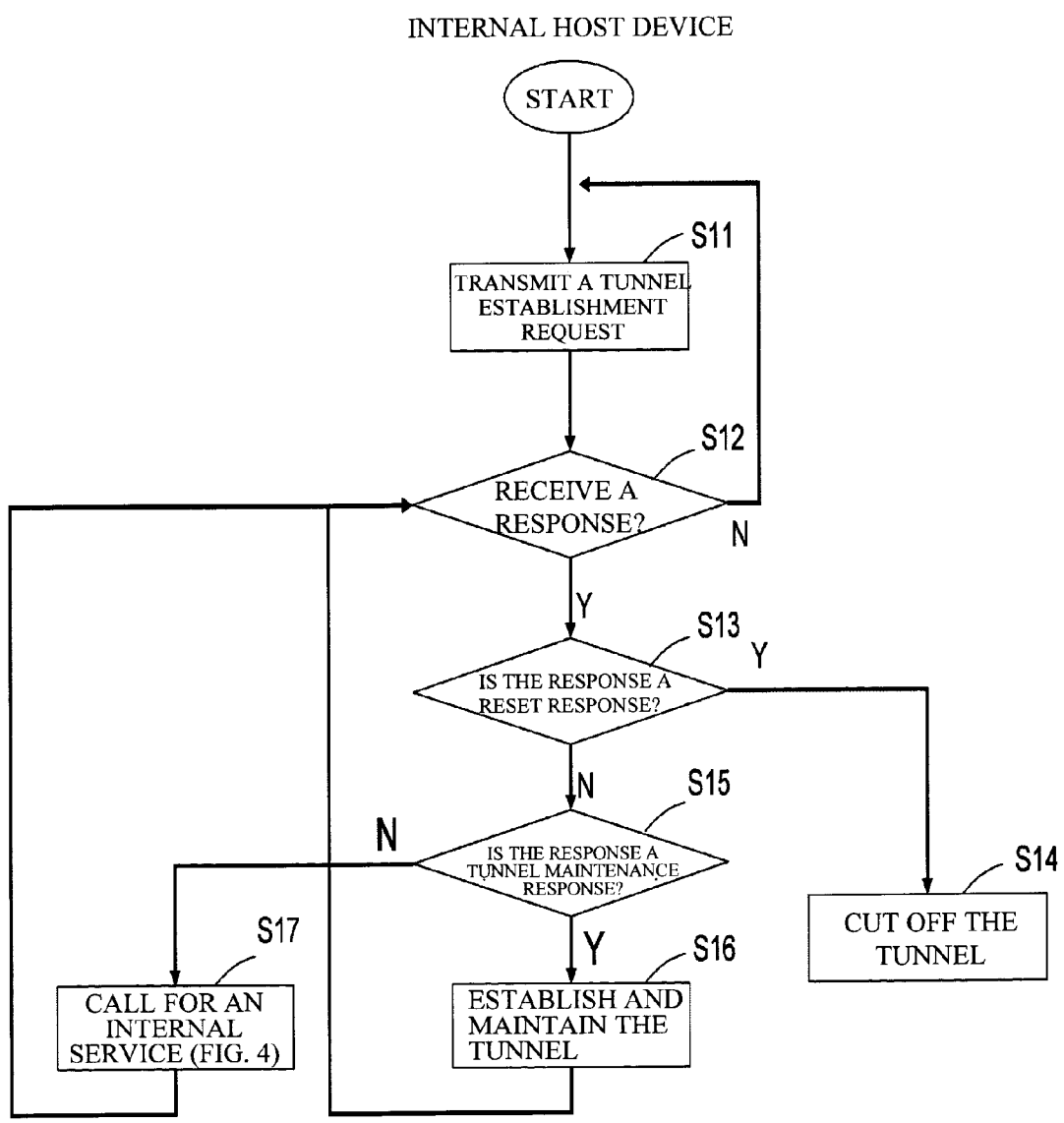
FIG. 2 is a flowchart of an operation to be performed by the internal host device when a tunnel is to be established.

Next, an operation to be performed by the internal host device 20 to establish the tunnel 50 is described. FIG. 2 is a flowchart of the operation to be performed by the internal host device 20 where the tunnel 50 is to be established. A tunnel establishing operation is started by a communication from the internal host device 20 to the external host device 30. First, the channel establishing and maintaining unit 22 of the internal host device 20 transmits tunnel establishment request information for establishing a tunnel with HTTP to the external host device 30 on the Internet via a proxy server or the like (step S11). If there is not a response (reply information) from the external host device 30 ("N" in step S12), the channel establishing and maintaining unit 22 returns to step S11. If there is a response from the external host device 30 ("Y" in step S12) and the response is a reset response ("Y" in step S13), the channel establishing and maintaining unit 22 determines that a tunnel cannot be established, and cuts off the tunnel (step S14). If the received response is a regular response ("N" in step S13) and the regular response is a tunnel maintenance response ("Y" in step S15), the channel establishing and maintaining unit 22 determines that the tunnel 50 has been established. A reset response is the information indicating that no actions are necessary on the side of the internal host device 20.

Where the tunnel 50 has been established and the received response is channel maintenance data for maintaining the channel ("Y" in step S15), the channel establishing and maintaining unit 22 of the internal host device 20 maintains the tunnel 50 as the external host device 30 requests tunnel maintenance (step S16), and then returns to step S12. If the received response is a service call ("N" in step S15), the channel establishing and maintaining unit 22 calls for an internal service (step S17), and then returns to step S12. In this manner, the tunnel 50 is established, and the external host device 30 can constantly call for the internal service 27 in the internal network 25 of the company. Upon receipt of the reset response, the channel establishing and maintaining unit 22 of the internal host device 20 determines that the maintenance of the tunnel is no longer necessary, and cuts off the tunnel (step S14).

Figure 3:
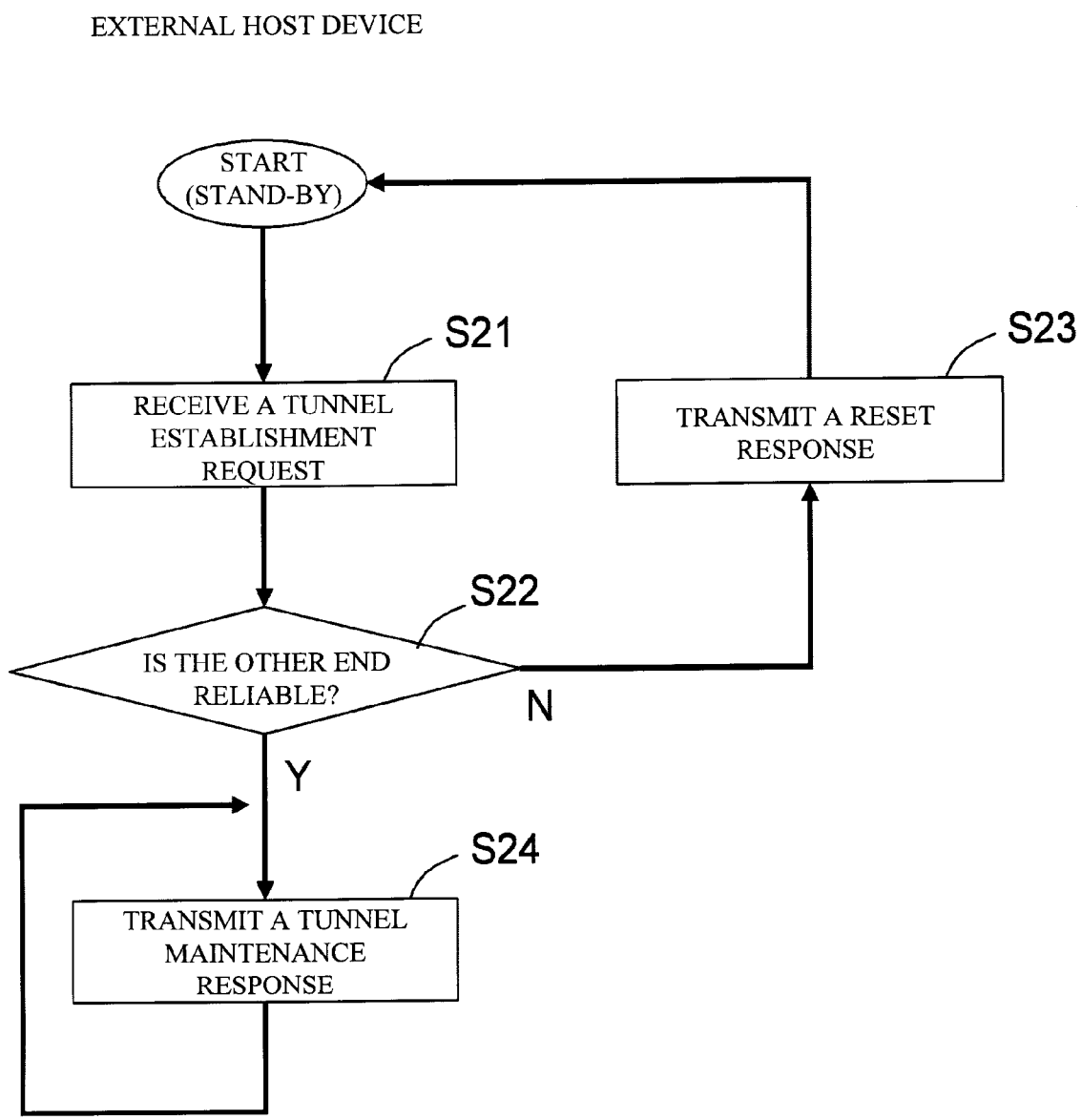
FIG. 3 is a flowchart of an operation to be performed by an external host device when a tunnel is to be established.

Next, an operation to be performed by the external host device 30 to establish the tunnel 50 is described. FIG. 3 is a flowchart of the operation to be performed by the external host device 30 where the tunnel 50 is to be established. The channel establishing and maintaining unit 32 of the external host device 30 receives a tunnel establishment request (step S21). The channel establishing and maintaining unit 32 of the external host device 30 then determines whether the other end of the requested tunnel is reliable. If the other end is not reliable ("N" in step S22), the channel establishing and maintaining unit 32 transmits a reset response (step S23).

If the other end is reliable ("Y" in step S22), the channel establishing and maintaining unit 32 of the external host device 30 transmits a tunnel maintenance response (step S24). Here, the communication data to be transmitted has an electronic signature attached thereto. Accordingly, the reliability of the host device at the other end can be checked by verifying the electronic signature.

The channel establishing and maintaining unit 32 generates a channel maintenance response only for maintaining a channel so as not to switch off the session at the channel. The channel establishing and maintaining unit 32 of the external host device 30 transmits the channel maintenance response to the internal host device 20. By transmitting the channel maintenance response, the channel establishing and maintaining unit 32 establishes and maintains a channel for calling for a service, with the firewall 40 or the like being interposed. Like the above-described communication data, the channel maintenance response has an electronic signature attached thereto. Thus, while the authenticity of the other end is verified in a connection through the firewall 40 or the like, a channel for service calling communications can be established and maintained.

Where the maintenance of the tunnel is no longer necessary, the channel establishing and maintaining unit 32 of the external host device 30 requests an end of the tunnel. When a session is hijacked, the fact can be detected by verifying the channel maintenance response. If a break is caused in a connection, the internal host device 20 transmits a reconnection request in a predetermined period of time.

Next, an operation to be performed by the internal host device 20 upon receipt of a service call is described. FIG. 4 is a flowchart of the operation to be performed by the internal host device 20 upon receipt of an internal service call. First, the internal host device 20 obtains a call identification number from the received internal service call (step S31). The internal host device 20 then obtains information as to the internal service being called for from the internal service call (step S32). The internal host device 20 then actually calls for the service (step S33). If there is a response to the internal service call ("Y" in step S34), the internal host device 30 forms a reply that includes the response and the call identification number obtained in step S31 (step S35). The internal host device 30 then transmits the reply to the external host device 30 (step S36). If there is not a response to the internal service call ("N" in step S34), this operation comes to an end.

Figure 5A:
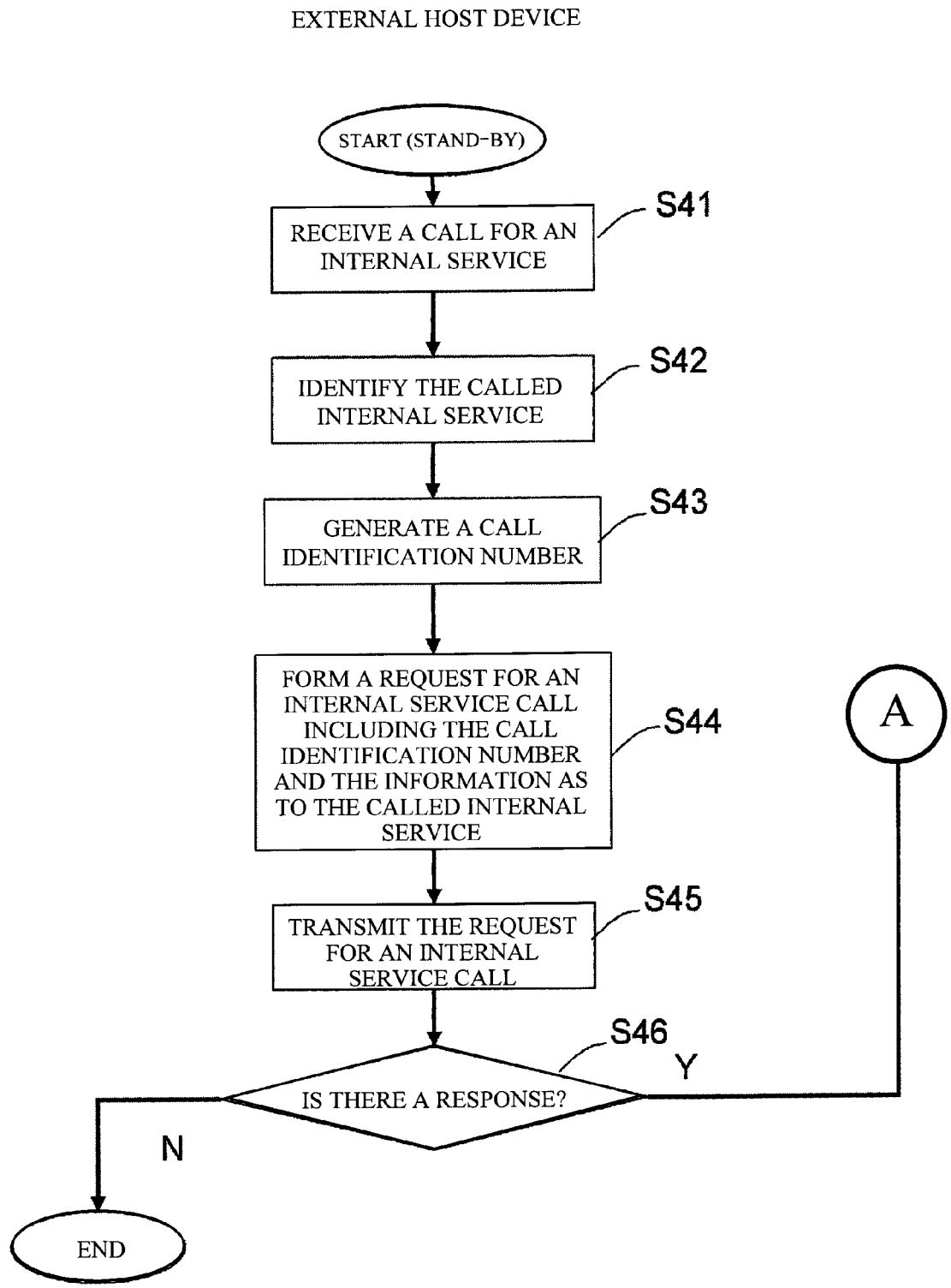
Figure 5B:
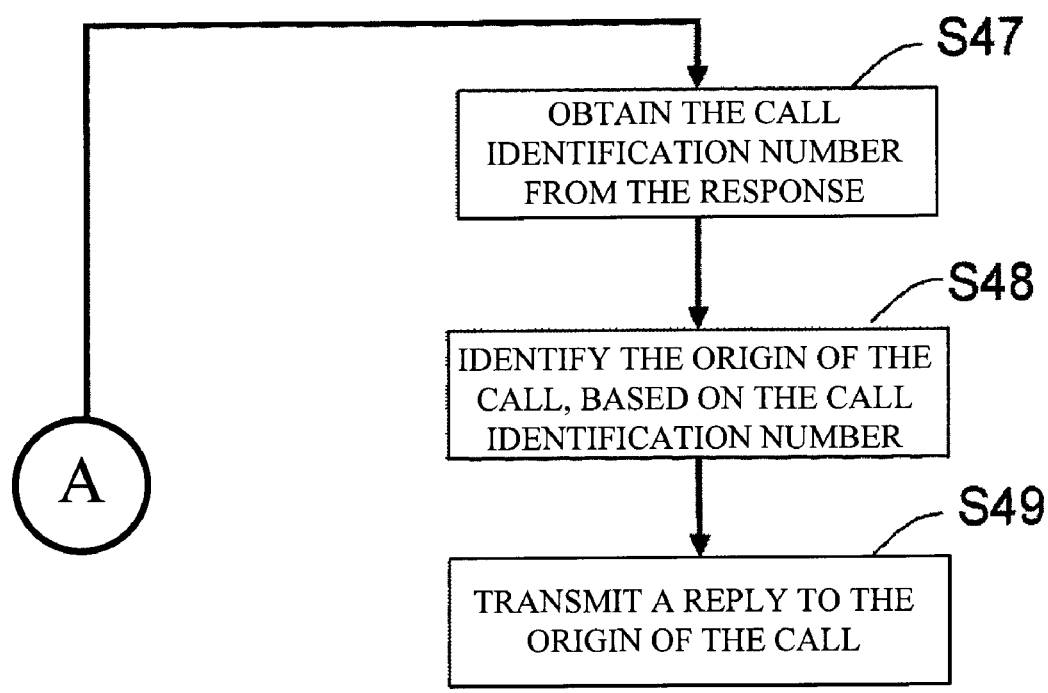

Next, an operation to be performed by the external host device 30 when an internal service is called for is described. FIG. 5A and FIG. 5B are a flowchart of the operation to be performed by the external host device 30 when an internal service is called for. The external host device 30 receives a call for the service 27 that is to be actuated by the terminal 26 existing in the internal network 25, from the program 37 executed by the terminal 36 connected to the external network 35 (step S41). The service call receiving unit 33 of the external host device 30 identifies the called internal service (step S42). The external host device 30 then generates the call identification number for identifying the call for the service (step S43). The external host device 30 then forms an internal service call request that contains the information as to the called internal service and the call identification number (step S44). The external host device 30 transmits the internal service call request to the internal host device 20 through the channel establishing and maintaining unit 32 (step S45).

Upon receipt of the internal service call request, the internal host device 20 calls for the internal service. The internal host device 20 then establishes a different channel from the tunnel 50, and transmits a response from the internal service to the external host device 30. When the external host device 30 receives the response ("Y" in step S46), the external host device 30 obtains the call identification number from the received response (step S47). Based on the call identification number, the external host device 30 identifies the origin of the call (step S48). The external host device 30 then transmits the response to the identified origin of the call (step S49). In this manner, the internal service can be called out beyond the firewall 40, and a response from the service can be received.

In the communication system in accordance with this exemplary embodiment, channel maintenance data is transmitted whenever it is necessary to maintain the tunnel 50, so that constant channel maintenance can be performed when the external host device 30 in the external network 35 establishes the tunnel 50 and communicates with the internal host device 20 in the internal network 25 beyond the firewall 40. Thus, no special settings need to be performed on the firewall 40, and a channel from the external network 35 to the internal network 25 can be established. Also, the communication system does not affect the existing network.

The communication method of this exemplary embodiment can be realized by the communication system 10. The internal host device 20 and the external host device 30 may be embodied by microcomputers each including a CPU, a ROM (Read Only Memory), a RAM (Random Access Memory), and the likes. In such a case, the CPU executes a predetermined program to realize the functions of the communication method.

This exemplary embodiment can also be applied to communications using a communication protocol such as SMTP (Simple Mail Transfer Protocol).

Second Exemplary Embodiment

Figure 6:
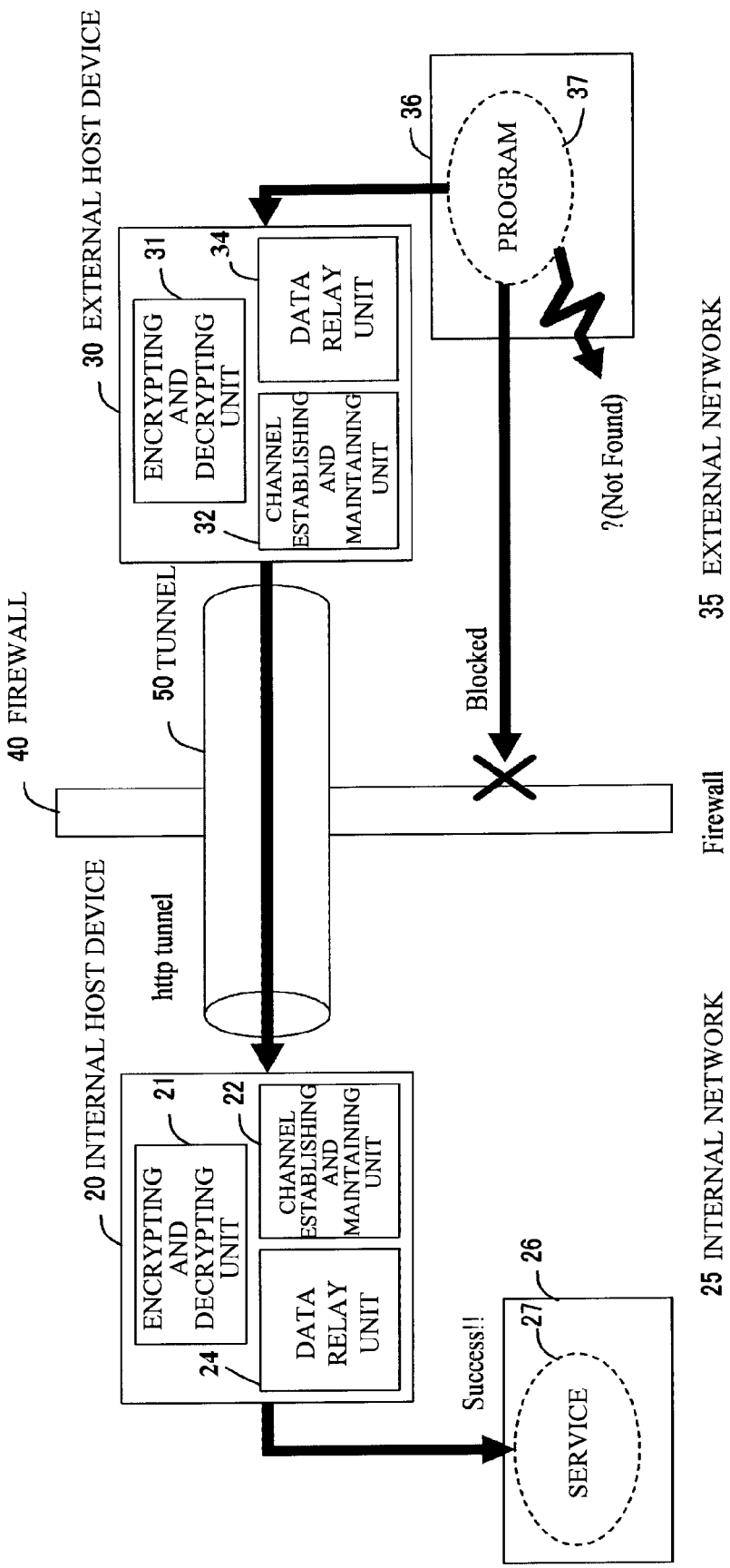
FIG. 6 illustrates the structure of a communication system (a communication apparatus) in accordance with a second exemplary embodiment of the present invention.

Next, a second exemplary embodiment of the present invention is described. FIG. 6 illustrates a communication system (a communication apparatus) in accordance with this embodiment. As shown in FIG. 6, the communication system 10 includes an internal host device 20 that starts a session, and an external host device 30 that receives the session. The internal host device 20 and the external host device 30 are connected to each other via a firewall 40. In this communication system 10, the firewall 40 blocks communications from the external host device 30 in an external network 35 to the internal host device 20 in an internal network 25, and selectively allows communications from the internal network 25 to the external network 35. In this environment, a tunnel 50 extending from the external host device 30 in the external network 35 to the internal host device 20 in the internal network 25 is constructed for communications.

The firewall 40 normally blocks communications from the external network 35 to the internal network 25 via the Internet. The firewall 40 also selectively allows communications from the internal network 25 to the external network 35. When the firewall 40 selectively allows a communication, only preauthorized packets among data packets to be transmitted between the internal network 25 and the external network 35 are allowed to pass, and the other packets are blocked. This operation is called a filtering operation. Alternatively, only communications via a special application called an "application gateway (typically, HTTP Proxy)" may be allowed. A filtering operation is normally set by designating the IP (Internet Protocol) address of the transmitting terminal, the IP address of the other end terminal, the type of protocol to be used, a port number, and the likes. A port number is an identifier to be used for identifying the process in the upper layer in TCP or UDP (User Datagram Protocol).

The internal host device 20 is connected to the internal network 25 such as an in-house intranet, and transmits a connection request to the external host device 30 existing in an outside network that is the external network 35. The internal host device 20 includes an encryption/decryption/signature/verification unit 21, a channel establishing and maintaining unit 22, and a data relay unit 24. The external host device 30 is connected to the external network 35 such as the Internet, and receives the connection request from the internal host device 20. The external host device 30 includes an encryption/decryption/signature/verification unit 31, a channel establishing and maintaining unit 32, and a data relay unit 34.

First, the internal host device 20 is described. The encryption/decryption/signature/verification unit 21 attaches an electronic signature to each piece of communication data by a public-key encryption technique, so as to verify or guarantee authenticity between the connected host devices. The encryption/decryption/signature/verification unit 21 can also secure data confidentiality by encrypting transmission data.

The encryption/decryption/signature/verification units 21 and 31 encrypt transmission data to be transmitted via the tunnel 50, and, if necessary, encrypt or decrypt a part of XML data. In a case where the transmission data is structured data and confidential information is contained in the transmission data, the encrypting and decrypting units 21 and 31 encrypt only a part (the essential part) of the structured data by an encryption technique such as the XML encryption technique.

The encryption/decryption/signature/verification unit 21 further encrypts communication data to be exchanged in the tunnel 50, so as to realize encrypted tunneling with higher confidentiality of communication contents. By this encrypted tunneling technique, a closed virtual network that can realize high-security connection links between terminals, or a function such as VPN, can be provided in a packet communication network that is originally on the basis of wireless connections. The data relay unit 24 uses the established tunnel 50 to relay data received from a program 37 of a terminal 36.

The encryption/decryption/signature/verification unit 31 also encrypts or decrypts transmission data to be transmitted via the tunnel 50. In a case where the transmission data is structured data and confidential information is contained in the transmission data, the encryption/decryption/signature/verification unit 31 encrypts only a part (the essential part) of the structured data by an encryption technique such as the XML encryption technique. In a case where the structured data is a SOAP document, the encryption/decryption/signature/verification unit 31 encrypts only the body of the structured data, and does not encrypt the header. Also, to verify the other end between connected host devices or to verify and guarantee the authenticity of the contents of each communication, the encryption/decryption/signature/verification unit 31 attaches an electronic signature to each piece of communication data through the use of the public-key encryption technique.

The encryption/decryption/signature/verification unit 31 attaches an electronic signature to a part or all of the payload of each communication. In a packet communication, the "payload" means the data in a packet, excluding the management information (header information) such as the other end address and the sender address. The encryption/decryption/signature/verification unit 31 encrypts a part or all of the payload of each communication with the use of a public key in accordance with the importance level of the data. More preferably, the encryption/decryption/signature/verification units 21 and 31 should use a public-key certificate issued by the certification authority.

The channel establishing and maintaining unit 32 establishes the tunnel 50 leading to the channel establishing and maintaining unit 22 of the internal host device 20, not encrypting the channel, in accordance with the Reverse Tunneling technique. To establish and maintain the channel, the channel establishing and maintaining unit 32 transmits and receives communication data for bidirectional communications.

To maintain the channel, the channel establishing and maintaining unit 32 transmits channel maintenance data for maintaining the tunnel 50 whenever it is necessary to maintain the tunnel 50. The channel maintenance data contains a random number and such data as NOP (No Operation: one of the CPU (Central Processing Unit) instructions) meaning there are no operations to be performed. After a connection is established, the channel establishing and maintaining unit 32 transmits the NOP data in appropriate timing to maintain the connection. More specifically, when it is not necessary to call for a service, the channel establishing and maintaining unit 32 transmits the channel maintenance data.

The random number is the data obtained by attaching a signature to a difficult-to-predict initial value generated by a pseudorandom number generator and encrypting the initial value and the signature. The internal host device 20 and the external host device 30 exchanges the initial values, so as to share the initial values. Thereafter, the internal host device 20 and the external host device 30 generate random numbers on the basis of the initial values in the same manner as above. This process is repeated so that either end can verify the other end of each communication.

The encryption/decryption/signature/verification unit 31 further has the function of attaching an electronic signature to each piece of the channel maintenance data, the function of verifying the other end of each communication by generating a random value on the basis of the initial value at the time of verification, the function of attaching a signature to the initial value with the use of a secret key of the transmitting end, and the function of encrypting the initial value with the use of a public key of the receiving end. The communication system 10 may further include a certification authorization unit that issues a certificate to the public key.

The data relay unit 34 relays data transmitted from the terminal 36 through the tunnel 50. The data relay unit 34 also receives a service call in the internal network 25, and transmits service call data for calling for a service to the internal host device 20. Here, to call for a service, the data relay unit 34 uses structured text data such as SOAP data (XML data, for example).

Figure 7:
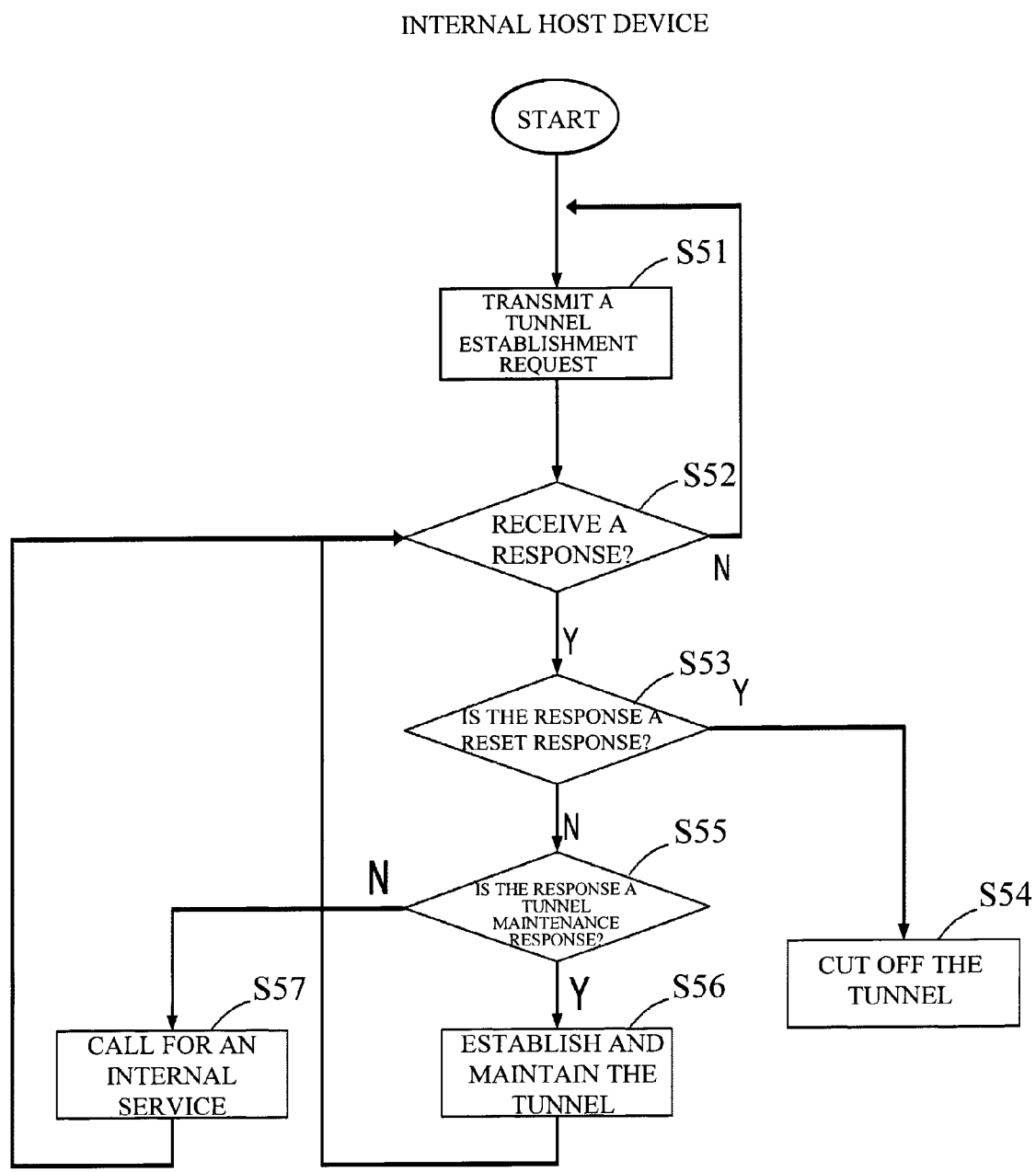
FIG. 7 is a flowchart of an operation to be performed by the internal host device when a tunnel is to be established.

Next, an operation to be performed by the internal host device 20 to establish the tunnel 50 is described. FIG. 7 is a flowchart of the operation to be performed by the internal host device 20 where the tunnel 50 is to be established. This operation is initiated by a communication from the internal host device 20 to the external host device 30. First, the channel establishing and maintaining unit 22 of the internal host device 20 transmits tunnel establishment request information for establishing a tunnel with the use of HTTP to the external host device 30 on the Internet via a proxy server or the like (step S51). If there is not a response from the external host device 30 ("N" in step S52), the channel establishing and maintaining unit 22 of the internal host device 20 returns to step S51. If there is a response from the external host device 30 ("Y" in step S52) and the response is a reset response ("Y" in step S53), the channel establishing and maintaining unit 22 determines that a tunnel cannot be established, and cuts off the tunnel (step S54). If the received response is a regular response ("N" in step S53) and the regular response is a tunnel maintenance response ("Y" in step S55), the channel establishing and maintaining unit 22 determines that the tunnel 50 has been established.

Where the tunnel 50 has been established and the received response is data for maintaining the channel ("Y" in step S55), the channel establishing and maintaining unit 22 of the internal host device 20 maintains the tunnel 50 (step S56), and then returns to step S52. If the received response is a service call ("N" in step S55), the channel establishing and maintaining unit 22 calls for an internal service (step S57), and then returns to step S52. Upon receipt of the reset response, the channel establishing and maintaining unit 22 of the internal host device 20 determines that the maintenance of the tunnel is no longer necessary, and cuts off the tunnel (step S54).

Figure 8:
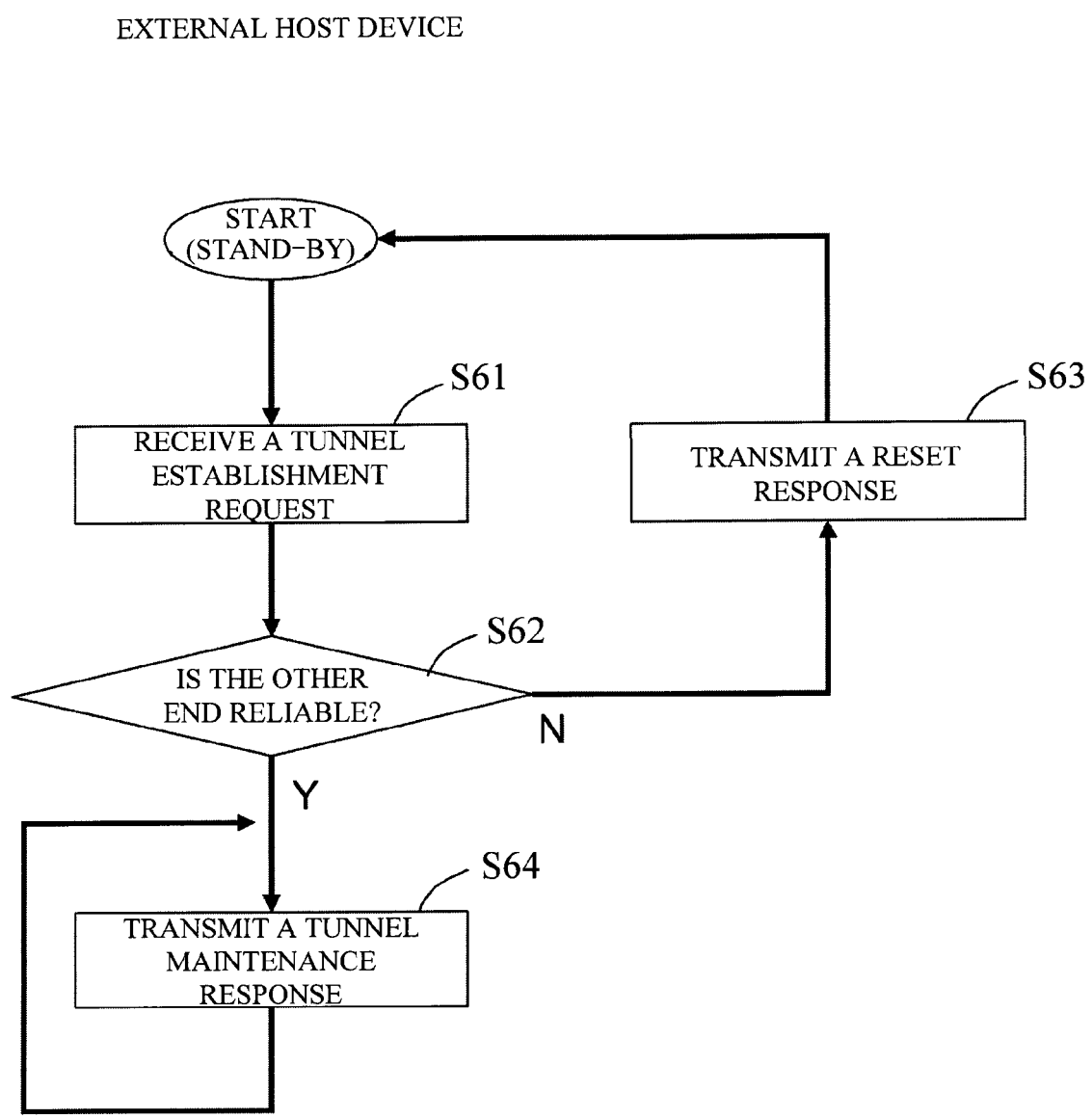
FIG. 8 is a flowchart of an operation to be performed by the external host device when a tunnel is to be established.

Next, an operation to be performed by the external host device 30 to establish the tunnel 50 is described. FIG. 8 is a flowchart of the operation to be performed by the external host device 30 where the tunnel 50 is to be established. The channel establishing and maintaining unit 32 of the external host device 30 receives a tunnel establishment request (step S61). The channel establishing and maintaining unit 32 of the external host device 30 then determines whether the other end of the requested tunnel is reliable. If the other end is not reliable ("N" in step S62), the channel establishing and maintaining unit 32 transmits a reset response (step S63).

If the other end is reliable (after a negotiation, "Y" in step S62), the channel establishing and maintaining unit 32 of the external host device 30 performs a tunnel establishing operation (step S64). Here, the communication data to be transmitted has an electronic signature attached thereto. Accordingly, the reliability of the host device at the other end of communication can be checked by verifying the electronic signature.

The channel establishing and maintaining unit 32 generates a channel maintenance response only for maintaining a channel so as not to switch off the session at the channel. The channel establishing and maintaining unit 32 of the external host device 30 transmits the channel maintenance response to the internal host device 20. By transmitting the channel maintenance response, the channel establishing and maintaining unit 32 establishes and maintains a channel for calling for a service, with the firewall 40 or the like being interposed in between. Like the above-described communication data, the channel maintenance response has an electronic signature attached thereto. Thus, while the authenticity of the other end is verified in a connection through the firewall 40 or the like, a channel for service calling communications can be established and maintained.

Where the maintenance of the tunnel is no longer necessary, the channel establishing and maintaining unit 32 of the external host device 30 requests an end of the tunnel. When a session is hijacked, the fact can be detected by verifying the channel maintenance response. If a break is caused in a connection, the internal host device 20 transmits a reconnection request in a predetermined period of time. In the communication system 10, channel maintenance data is transmitted whenever it is necessary to maintain the tunnel 50, so that constant channel maintenance can be performed when the external host device 30 in the external network 35 establishes the tunnel 50 and communicates with the internal host device 20 in the internal network 25 beyond the firewall 40. Thus, the terminal 36 can constantly transmit data to the terminal 26 via the data relay unit 34 in the external host device 30, the tunnel 50, and the data relay unit 24 in the internal host device 20.

Figure 9:
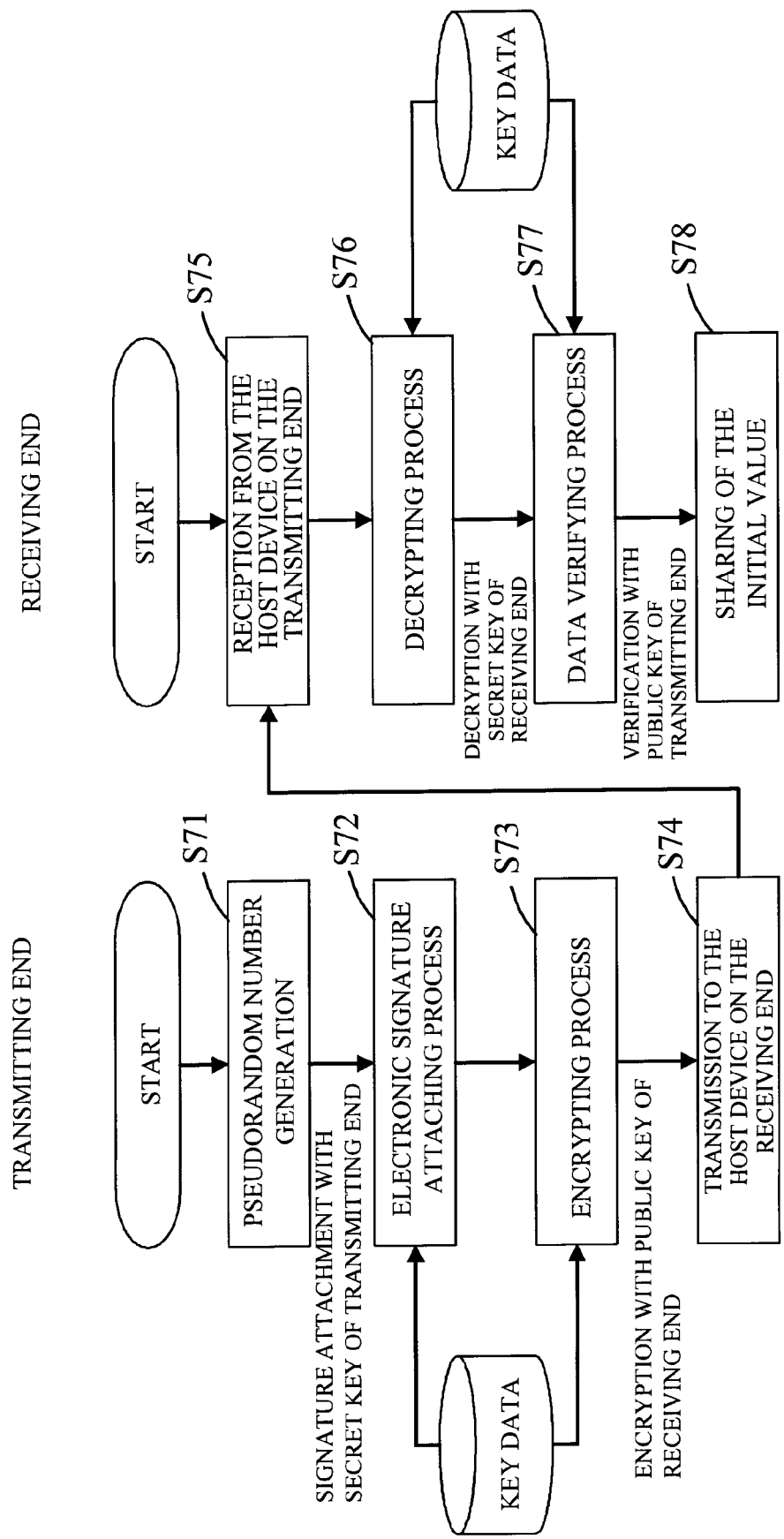
FIG. 9 is a flowchart of a verifying and initial value sharing operation.

FIG. 9 is a flowchart of a verifying and initial value sharing operation. First, the pseudorandom number generator in the internal host device 20 on the transmission end generates a pseudorandom number (step S71). This pseudorandom number serves as the initial value. The encryption/decryption/signature/verification unit 21 of the internal host device 20 puts an electronic signature to the initial value on the basis of the secret key on the transmitting end (step S72). The encryption/decryption/signature/verification unit 21 of the internal host device 20 then encrypts the initial value on the basis of the public key of the external host device 30 on the receiving end (step S73). The encryption/decryption/signature/verification unit 21 of the internal host device 20 transmits the encrypted initial value having a signature to the external host device 30 (step S74).

The external host device 30 on the receiving end receives the encrypted initial value having a signature from the internal host device 20 (step S75). The encryption/decryption/signature/verification unit 31 of the external host device 30 decrypts the encrypted initial value having a signature, through the use of the secret key of the external host device 30 on the receiving end (step S76). The encryption/decryption/signature/verification unit 31 of the external host device 30 then verifies the data with the use of the public key of the internal host device 20 on the transmitting end (step S77). In this manner, the internal host device 20 and the external host device 30 can share the initial value (step S78). Although the pseudorandom generator in the internal host device 20 generates the initial value to be transmitted to the external host device 30 in the above-described operation, the pseudorandom generator may be provided in the external host device 30, and generate a initial value to be transmitted to the internal host device 20.

In the above-described communication system, channel maintenance data is transmitted whenever it is necessary to maintain a tunnel, so that constant channel maintenance can be performed when the external host device in an external network establishes the tunnel and communicates with the internal host device in an internal network beyond the firewall. Also, by attaching an electronic signature to each piece of channel maintenance data for maintaining a channel, the connection origin can verify the reliability of the other end of the communication, and the host device at the other end can guarantee the reliability of its own. Thus, a mechanism for preventing a mala fide third party from spoofing and detecting a malicious change made to communication contents can be provided.

Also, connections can be established beyond a firewall, and a channel can be maintained so that bidirectional communication can be performed. As the network manager can monitor communications, a resource in an internal network protected by a firewall or the like can be accessed, without a change in the network structure or the firewall system. The above-described encryption/decryption/signature/verification units 21 and 31 put an electronic signature to each piece of communication data through the use of the public-key encryption technique, so that the receiving end can verify the electronic signature. In this manner, spoofing and data falsifications can be detected. Also, as data is encrypted, data confidentiality can be secured. Thus, in a connection beyond a firewall or the like, the reliability of the other end and the authenticity of the communication contents can be verified.

The communication method of this exemplary embodiment can be realized by the communication system 10. The internal host device 20 and the external host device 30 may be embodied by microcomputers each including a CPU, a ROM (Read Only Memory), a RAM (Random Access Memory), and the likes. In such a case, the CPU executes a predetermined program to realize the functions of the communication method.

Although a few exemplary embodiments of the present invention have been shown and described, it would be appreciated by those skilled in the art that changes may be made in these exemplary embodiments without departing from the principles and spirit of the invention, the scope of which is defined in the claims and their equivalents.

What is claimed is:

1. A communication system comprising:
an internal host device that is connected to an internal network connected to an external network through a firewall that blocks communications from the external network and selectively allows the communications to the external network and includes a first establishing and maintaining unit and a service call unit; and
an external host device that is connected to the external network and includes a second establishing and maintaining unit and a service call receiving unit,
wherein:
the first establishing and maintaining unit transmits a communication session establishment request to the external host device, and determines that the communication session that communicates to the internal host device from the external host device has been established when the response received from the second establishing and maintaining unit is a communication session maintenance response;
the second establishing and maintaining unit transmits the communication session maintenance response to the first establishing and maintaining unit on the basis of the communication session establishment request received from the first establishing and maintaining unit, and constantly transmits a channel maintenance response to the first establishing and maintaining unit in appropriate timing to maintain the communication session;
the service call receiving unit identifies a service received from an another device in the external network on the basis of a call of the service, and transmits a service call request that includes a call identification number for identifying the call to the first establishing and maintaining unit through the communication session from the second establishing and maintaining unit;
the first establishing and maintaining unit maintains the communication session without cutting off the communication session when the response received from the second establishing and maintaining unit is the channel maintenance response, and calls a service in the internal network according to the service call request received from the service call receiving unit by the service call unit and transmits the response to the call of the service and the call identification number to the external host device through another channel different from the communication session when the response received from the second establishing and maintaining unit is the service call response if it is determined that the communication session has been established;
the service call receiving unit identifies the device of the call origin that has called the service on the basis of the call identification number received from the service call unit through the another channel, and transfers the response received from the service call unit through the another channel to the identified device.

2. The communication system according to claim 1, wherein the communication session is a reverse tunnel.

3. The communication system according to claim 2, wherein the communication session is established through Hypertext Transfer Protocol (HTTP).

4. The communication system according to claim 1, wherein the channel maintenance response includes a random number that is obtained by attaching a signature to a predetermined initial value and encrypting the predetermined initial value having the signature attached thereto.

5. A client device connected to an external network connected to an internal network through a firewall that blocks communications from the internal network and selectively allows the communications to the internal network, the client device comprising:
a central processing unit that controls the client device to implement:
an establishing and maintaining unit that receives from an internal host device connected to the internal network a communication session establishment request and constantly transmits to the internal host device a communication session maintenance response on the basis of the received communication session establishment request in appropriate timing to maintain the communication session without cutting off the communication session; and
a service call receiving unit that identifies a service received from an another device in the external network on the basis of a call of the service, and transmits a service call request that includes a call identification number for identifying the call to the internal host device through the communication session, receives from the internal host device a response to the call of the service and the call information number through another channel different from the communication session, and identifies the device of the call origin that has called the service on the basis of the call identification number received from the service call unit through the another channel, and transfers the response received from the service call unit through the another channel to the identified device.

6. The client device according to claim 5, wherein the communication session is a reverse tunnel.

7. The client device according to claim 6, wherein the communication session is established through Hypertext Transfer Protocol (HTTP).

8. A service providing device that is connected to an internal network connected to an external network through a firewall that blocks communications from the external network and selectively allows the communications to the external network, the service providing device comprising:
a central processing unit that controls the service providing device to implement:
an establishing and maintaining unit that transmits to an external host device connected to the external network a communication session establishment request, receives from the external host device a communication session maintenance response on the basis of the communication session establishment request, determines that the communication session that communicates to the internal host device from the external host device has been established when receiving from the communication session maintenance response from the external host device, and maintains the communication session without cutting off the communication session when the response received from the external host device is the channel maintenance response;
a service call unit that receives from the external host device a service call request of another device in the external network on the basis of a call of the service that includes a call identification number for identifying the call to the establishing and maintaining unit through the communication session,
wherein the establishing and maintaining unit calls a service in the internal network according to the service call request received from the external host device and transmits the response to the call of the service and the call identification number to the external host device through another channel different from the communication session when the response received from the external host device is the service call response if it is determined that the communication session has been established.

9. The service providing device according to claim 8, wherein the communication session is a reverse tunnel.

10. The service providing device according to claim 9, wherein the communication session is established through Hypertext Transfer Protocol (HTTP).

* * * * *